July 21, 1936.  C. A. CALDWELL  2,048,424
SWIVEL NUT LOCK
Filed Dec. 14, 1933
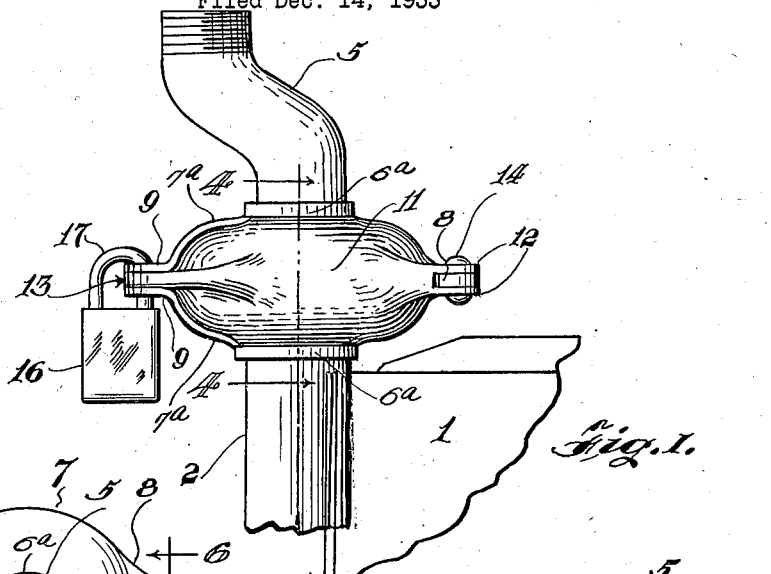
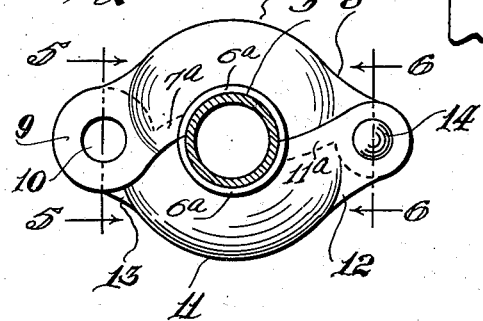
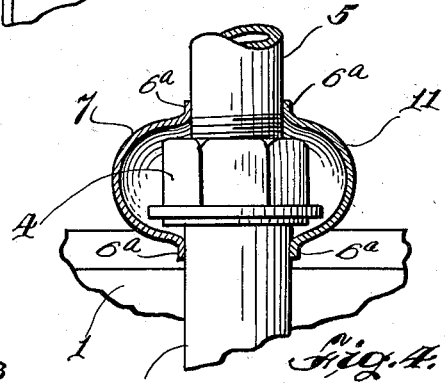
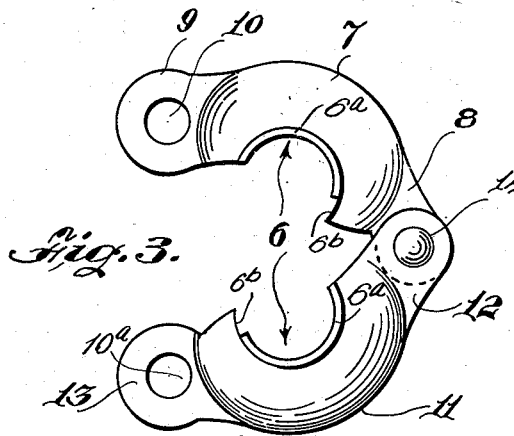
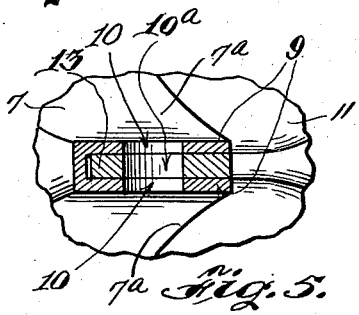
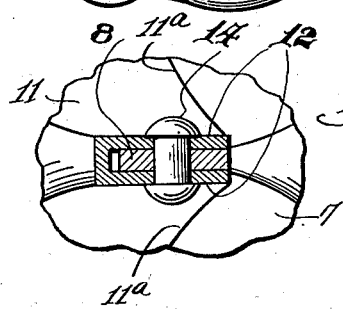
INVENTOR.
C. A. Caldwell,
BY
John M. Spellman
ATTORNEY.

Patented July 21, 1936

2,048,424

UNITED STATES PATENT OFFICE 2,048,424

SWIVEL NUT LOCK

Charles A. Caldwell, Dallas, Tex.

Application December 14, 1933, Serial No. 702,411

1 Claim. (Cl. 70—122)

This invention relates to improvements in locking and sealing means for swivel nuts or coupling nuts, whereby the inlet and outlet pipes of a gas meter are connected to a gas supply line.

The invention seeks to protect said locking and sealing means against unwarranted tampering of the nut in removing the gas meter and inserting a by-pass pipe, interference with the mechanism of the meter, or turning the meter around which would prevent the gas meter from registering.

The new and improved swivel-nut or coupling nut protective lock and sealing means consists of two cooperative companion pieces of any suitable material, preferably sheet metal (terne plate being very adaptable), and of substantial elliptical shape in cross-section when in closed position on a swivel nut or coupling nut. These two pieces, halves or companion members thus provide a shell or hollow body which allows ample room for the body to be turned around the swivel nut or coupling nut with freedom. When joined the two parts interfit marginally somewhat in telescopic fashion or overlapped relation with each other and when a padlock or other fastening means is applied to the ends, form a very efficacious lock or seal for the purpose intended.

The invention may be readily understood from a perusal of the following detailed description, taken in connection with the accompanying drawing, forming a part of this specification and in which:

Figure 1 is a side elevational view of a practical adaptation of the lock and sealing device in closed position on one of the connecting pipes of a gas meter.

Figure 2 is a top plan view of the lock, also in closed position, with the nipple or short pipe shown in cross-section.

Figure 3 is a view similar to that shown in Figure 2, but showing the lock removed from the meter and in open or disengaged position.

Figure 4 is a vertical sectional view of the lock, the view being had on the line 4—4 of Figure 1, and—

Figures 5 and 6 are cross-sectional views of the hinge end and fastening end of the lock, the views being taken on the lines 5—5 and 6—6, respectively, of Figure 2.

Reference being now had to the drawing in detail, like parts in the several views having like identifying numerals: in Figure 1 is shown in part a gas meter 1 and 2 represents one of the gas meter pipes as the outlet pipe, inlet pipe, or both pipes may be protected if desired by one of the locks.

In Figures 1 and 2 the complete lock and seal is shown in position on a gas meter pipe 2. The lock is constructed of two pieces of any suitable metal, but is preferably blanked and die-formed of sheet metal such as terne plate for instance, which serves admirably for the purpose. In Figure 1 it will be observed that the side of each piece or half of the lock is somewhat elliptical in elevation and also in cross-section in Figure 4, so that there is provided a hollow body sufficiently long and wide and of a curvature to embrace loosely and with considerable clearance the swivel nut 4, which nut serves to join the pipe 2 with the goose-neck or nipple 5. The nipple 5 is obviously connected to the gas supply pipe (not shown). Both pieces or members 7 and 11 of the shell have a semi-circular opening 6 to embrace the nipple 5 and the meter pipe 2, respectively, as clearly shown in Figures 2, 3 and 4. The piece or member 7 has an apertured ear 8 formed at one end and two spaced parallel ears 9 formed by folding the opposite end portion, said ears 9 being provided with alined or registering openings 10. The companion piece or member 11 is made similarly to the piece or member 7, it having two spaced ears 12 at one end to receive between them the ear 8 of said piece or member 7 and being correspondingly apertured to receive the hinge pin or stud 14, as best shown in Figure 6. The piece or member 11 has an ear 13 at its opposite end, apertured as at 10ª, and adapted to fit between the correspondingly apertured ears 9 when said pieces or members 7 and 11 are in closed position, it being apparent that there are three thicknesses of metal at each end and overlapping each other in the closed relation of the parts, and an applied fastener such as a padlock 16 with its hasp 17 placed through the openings 10 and 10ª securely fastens the lock in position around the swivel or coupling nut 4 against tampering or unauthorized or unwarranted removal.

As shown, the metal of the body portions 7 and 11 is flanged outwardly about the semi-circular openings 6, as at 6ª, and to permit the overlapping of the meeting marginal portions, as at 7ª and 11ª (see Figure 2), one adjacent end of each flanged portion 6ª is cut away, as at 6ᵇ (as best shown in Figure 3), thereby permitting the said portions 7ª and 11ª to overlap the corresponding meeting portions of the companion member when the device is in closed condition, as shown in Figure 2, in which closed condition the meeting ends of the flanged portions 6ª abut each other.

While the disclosure shows a practical working embodiment of the invention, it should be understood that the form of construction may be modified and altered to an extent within the scope and meaning of the appended claim.

What is claimed as new is:

The herein described protector for swivel nuts and couplings, comprising two companion hollow shell body members, each of semi-elliptical cross section and meeting with overlapped marginal portions in cooperative closed condition, the meeting middle marginal portions of said members being semi-circularly recessed to provide a central opening to accommodate a pipe at opposite sides, the hollow body adapted to embrace loosely with considerable clearance a swivel nut or coupling connecting two pipes, said pipes adapted to enter the hollow body from opposite sides, said companion body members having interfitting ears at one end hingedly attached, and at the opposite end interfitting ears provided with registering apertures for the reception of a locking element, the recessed meeting marginal portions of the companion body members providing the described central openings in the closed device further described as being flanged outwardly annularly thereof, and an end portion of each flanged recessed portion of each companion body member being cut away to provide clearance, whereby, in the closed condition of the device, with the meeting marginal portions of the body shell overlapped, the ends of the flanged portions meeting in abutting relation.

CHARLES A. CALDWELL.